(12) United States Patent
Xiang et al.

(10) Patent No.: US 10,775,654 B2
(45) Date of Patent: Sep. 15, 2020

(54) MANUFACTURING METHOD FOR FLEXIBLE LIQUID CRYSTAL DISPLAY PANEL

(71) Applicant: SHENZHEN CHINA STAR OPTOELECTRONICS TECHNOLOGY CO., LTD., Shenzhen, Guangdong (CN)

(72) Inventors: Xiaoqun Xiang, Guangdong (CN); Rui Zhao, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 129 days.

(21) Appl. No.: 16/088,298

(22) PCT Filed: Aug. 30, 2018

(86) PCT No.: PCT/CN2018/103217
§ 371 (c)(1),
(2) Date: Sep. 25, 2018

(87) PCT Pub. No.: WO2019/179047
PCT Pub. Date: Sep. 26, 2019

(65) Prior Publication Data
US 2020/0166795 A1    May 28, 2020

(30) Foreign Application Priority Data
Mar. 22, 2018   (CN) .......................... 2018 1 0241530

(51) Int. Cl.
*G02F 1/1333*    (2006.01)
*G02F 1/1334*    (2006.01)
(Continued)

(52) U.S. Cl.
CPC ...... *G02F 1/133305* (2013.01); *G02F 1/1334* (2013.01); *G02F 1/13394* (2013.01);
(Continued)

(58) Field of Classification Search
CPC ............ G02F 1/133305; G02F 1/1334; G02F 1/13394; G02F 1/136209; G02F 2001/133354; G02F 2001/133357
See application file for complete search history.

(56) References Cited

U.S. PATENT DOCUMENTS

| 5,766,694 A | 6/1998 | West et al. |
| 2019/0155073 A1* | 5/2019 | Lee .................. G02F 1/136286 |

(Continued)

FOREIGN PATENT DOCUMENTS

| CN | 105785667 A | 7/2016 |
| CN | 105954920 A | 9/2016 |

(Continued)

*Primary Examiner* — Joseph L Williams
*Assistant Examiner* — Jose M Diaz
(74) *Attorney, Agent, or Firm* — Leong C. Lei

(57) ABSTRACT

A manufacturing method for a flexible liquid crystal display panel is provided. The method includes steps of: providing multiple light-shielding patterns disposed at a side of the rigid base and arranged as a matrix, providing a second substrate disposed at a side of the multiple light-shielding patterns away from the rigid base or disposed at a side of rigid base away from the multiple light-shielding patterns; aligning a side of the second substrate away from the rigid base with the first substrate, disposing a liquid crystal layer between the first substrate and the second substrate to obtain a liquid crystal cell, wherein the liquid crystal layer includes liquid crystal molecules and polymerizable monomer, and using an ultraviolet light to irradiate the liquid crystal cell at (Continued)

a side of the rigid base away from second substrate to form an organic polymer barrier corresponding to a gap between the light-shielding patterns.

11 Claims, 14 Drawing Sheets

(51) Int. Cl.
*G02F 1/1335* (2006.01)
*G02F 1/1339* (2006.01)
*G02F 1/1362* (2006.01)

(52) U.S. Cl.
CPC .. *G02F 1/133512* (2013.01); *G02F 1/136209* (2013.01); *G02F 2001/133354* (2013.01); *G02F 2001/133357* (2013.01)

(56) References Cited

U.S. PATENT DOCUMENTS

2019/0278139 A1* 9/2019 Smith .................. G02F 1/1368
2020/0026133 A1* 1/2020 Wang ................ G02F 1/136209

FOREIGN PATENT DOCUMENTS

| CN | 105974631 A | 9/2016 |
| CN | 106896559 A | 6/2017 |
| CN | 108398821 A | 8/2018 |

* cited by examiner

MANUFACTURING METHOD FOR FLEXIBLE LIQUID CRYSTAL DISPLAY PANEL

RELATED APPLICATIONS

The present application is a National Phase of International Application Number PCT/CN2018/103217, filed Aug. 30, 2018, and claims the priority of China Application No. 201810241530.3, filed Mar. 22, 2018.

FIELD OF THE INVENTION

The present invention relates to a liquid crystal technology field, and more particularly to a method for a flexible liquid crystal display panel.

BACKGROUND OF THE INVENTION

A Liquid Crystal Display (LCD) includes a case, a liquid crystal panel and a backlight module deposed inside case. Wherein the liquid crystal panel is formed by a Color Filter Substrate (CF Substrate), a Thin Film Transistor Array Substrate (TFT Array Substrate), Liquid Crystal Layer (LC) clamped between the CF Substrate and the TFT Array Substrate, and a sealant. Opposite inner sides of the CF substrate and TFT array substrate have transparent electrodes, the liquid crystal display controls the alignment direction of the liquid crystal molecules through an electric field in order to change a polarization state of the light and realize a penetration and blocking through a polarizer to achieve the display purpose.

Along with the development of the display technology, the requirement of the consumer electronics for the people is not limited in the functionality, but also the design and artistry and having good visual experience. A corresponding liquid crystal display device is not only has a novel design, but also having a better visual experience. The flexible liquid crystal display panel is a core part of the flexible liquid crystal display panel.

Currently, the flexible liquid crystal display panel adopts a flexible material as a base structure of the CF substrate and the TFT array substrate in order to realize a flexible display. In the conventional flexible liquid crystal display panel, an organic polymer barrier is disposed between the CF substrate and the TFT array substrate in order to support the liquid crystal cell and stabilize the state of the liquid crystals when the panel is bent.

In the conventional art, the manufacturing method for the organic polymer barrier is to dispose a liquid crystal layer mixed with a polymerizable monomer between the CF substrate and the TFT array substrate in order to form the liquid crystal cell. At a side of the CF substrate or the TFT array substrate away from the liquid crystal layer, a fine mask is provided. The fine mask has an opening, and using the fine mask to perform an UV exposure to the liquid crystal display panel such that the polymerizable monomer is reacted, and the opening corresponding to the fine mask forms the polymer barrier. However, the fine mask is expensive, and will generate a slit diffraction so that the precision of the exposure is hard to control, the process is complex and the production cost is greatly increased.

SUMMARY OF THE INVENTION

The purpose of the present invention is to provide a manufacturing method for a flexible liquid crystal display panel, which can increase the fineness of the organic polymer barrier, reduce the complex degree in the process and reduce the production cost.

In order to achieve the above purpose, the present invention provides a manufacturing method for a flexible liquid crystal display panel, comprising steps of: providing a first substrate, a rigid base, multiple light-shielding patterns disposed at a side of the rigid base and arranged as a matrix, a second substrate disposed at a side of the multiple light-shielding patterns away from the rigid base or disposed at a side of rigid base away from the multiple light-shielding patterns; aligning a side of the second substrate away from the rigid base 200 with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions; using an ultraviolet (UV) light to irradiate the liquid crystal cell at a side of the rigid base away from second substrate in order to form an organic polymer barrier corresponding to a gap between the light-shielding patterns.

Wherein each light-shielding pattern has a same size as the pixel region blocked by the light-shielding pattern.

Wherein the method further includes a step of removing the rigid base and the light shielding pattern from the second substrate.

Wherein the first substrate is a TFT array substrate and a second substrate is a CF substrate.

Wherein the TFT array substrate includes a first flexible base, a TFT array layer and a color resist layer sequentially disposed at a side of the flexible base, a black matrix and a pixel electrode disposed at a side of the color resist layer away from the first flexible base, a spacer disposed at a side of the black matrix away from the first flexible base; the CF substrate includes a second flexible base, and a common electrode layer disposed at a side of the second flexible base away from the rigid base; when aligning a side of the CF substrate away from the rigid base with the TFT array substrate, a side of the TFT array substrate provided with a spacer is opposite to a side of the CF substrate provided with the common electrode.

Wherein the CF substrate is disposed at a side of the light-shielding pattern away from the rigid base; a planarization layer is disposed between the CF substrate and the light-shielding pattern; the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer in order to obtain multiple light-shielding patterns arranged as a matrix, forming the planarization layer that covers the multiple light-shielding patterns on the rigid base, sequentially forming the second flexible base and a common electrode layer at a side of the planarization layer away from the light-shielding patterns in order to obtain the CF substrate.

Wherein the CF substrate is disposed at a side of the light-shielding pattern away from the rigid base; the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer to obtain multiple light-shielding patterns arranged as a matrix, sequentially forming the second flexible base and the common electrode at a side of the rigid base away from the light-shielding pattern in order to obtain the CF substrate, or sequentially forming the second base and the common electrode at a side of the rigid base in order to obtain the CF substrate, forming a light-shielding material layer at a side of the rigid base away from the CF substrate, exposing and developing the light-shielding material layer to obtain multiple light-shielding patterns arranged as a matrix.

Wherein the first substrate is a CF substrate and the second substrate is a TFT array substrate; the CF substrate includes a first flexible base and a common electrode disposed at a side of the first flexible base; the TFT array substrate a second flexible base, a TFT array layer and a color resist layer sequentially disposed at a side of the second flexible base away from the rigid substrate, a black matrix and a pixel electrode disposed at a side of the color resist layer away from the second flexible base and a spacer disposed at a side of the black matrix away from the second flexible base; when aligning a side of the TFT array substrate away from the rigid base with the CF substrate, a side of the CF substrate provided with the common electrode is opposite to a side of the TFT array substrate provided with the spacer.

Wherein the process of forming the light-shielding pattern at a side of the rigid base, and forming a TFT array substrate at a side of the light-shielding pattern away from the rigid base is: forming a light-shielding material layer at a side of the rigid base, exposing and developing the light-shielding material layer in order to obtain multiple light-shielding patterns arranged as a matrix, forming the planarization layer that covers the multiple light-shielding patterns on the rigid base, sequentially forming the second flexible base, a TFT array layer and a color resist layer at a side of the planarization layer away from the light-shielding patterns, forming a black matrix and a pixel electrode at a side of the color resist layer; away from the second flexible base, manufacturing the spacer at a side of the black matrix away from the second flexible base.

Wherein the TFT array substrate is disposed at a side of the rigid base away from the light-shielding pattern; the process of forming the light-shielding pattern at a side of the rigid base, and forming a TFT array substrate at a side of the light-shielding pattern away from the rigid base is: forming a light-shielding material layer at a side of the rigid base, exposing and developing the light-shielding material layer to obtain multiple light-shielding patterns arranged as a matrix, sequentially forming the second flexible base, the TFT array layer and the color resist layer at a side of the rigid base away from the light-shielding patterns, forming the black matrix and the pixel electrode at a side of the color resist layer away from the second flexible base, manufacturing a spacer at a side of the black matrix away from the second flexible base in order to obtain the TFT array substrate; or, sequentially forming a second flexible base, a TFT array layer and a color resist layer at a side of the rigid base, manufacturing the black matrix layer and the pixel electrode at a side of the color resist layer away from the second flexible base, manufacturing a spacer at a side of the black matrix away from the second flexible base in order to obtain the TFT array substrate, forming a light-shielding material layer at a side of the rigid base away from the TFT array substrate, exposing and developing the light-shielding material layer to obtain multiple light-shielding patterns arranged as a matrix.

The present invention also provides a manufacturing method for a flexible liquid crystal display panel, comprising steps of: providing a first substrate, a rigid base, multiple light-shielding patterns disposed at a side of the rigid base and arranged as a matrix, a second substrate disposed at a side of the multiple light-shielding patterns away from the rigid base or disposed at a side of rigid base away from the multiple light-shielding patterns; aligning a side of the second substrate away from the rigid base 200 with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions; using an ultraviolet (UV) light to irradiate the liquid crystal cell at a side of the rigid base away from second substrate in order to form an organic polymer barrier corresponding to a gap between the light-shielding patterns; removing the rigid base and the light shielding pattern from the second substrate; wherein each light-shielding pattern has a same size as the pixel region blocked by the light-shielding pattern; wherein the first substrate is a TFT array substrate and a second substrate is a CF substrate; wherein the TFT array substrate includes a first flexible base, a TFT array layer and a color resist layer sequentially disposed at a side of the flexible base, a black matrix and a pixel electrode disposed at a side of the color resist layer away from the first flexible base, a spacer disposed at a side of the black matrix away from the first flexible base; the CF substrate includes a second flexible base, and a common electrode layer disposed at a side of the second flexible base away from the rigid base; and when aligning a side of the CF substrate away from the rigid base with the TFT array substrate, a side of the TFT array substrate provided with a spacer is opposite to a side of the CF substrate provided with the common electrode.

The beneficial effect of the present invention: in the manufacturing method for a flexible liquid crystal display panel, manufacturing multiple light-shielding patterns disposed at a side of the rigid base and arranged as a matrix, a second substrate disposed at a side of the multiple light-shielding patterns away from the rigid base 200 or disposed at a side of rigid base away from the multiple light-shielding patterns; aligning a side of the second substrate away from the rigid base with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions; using an ultraviolet (UV) light to irradiate the liquid crystal cell at a side of the rigid base away from second substrate in order to form an organic polymer barrier corresponding to a gap between the light-shielding patterns. The present invention is simple in the process, and can effectively increase the fineness of the organic polymer barrier, and reduce the production cost.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person

DETAILED DESCRIPTION OF THE PREFERRED EMBODIMENT

In order to further illustrate the technology solution and the effect of the present invention, the following will combine preferred embodiments and figures to describe the present invention in detail.

Figure 1:
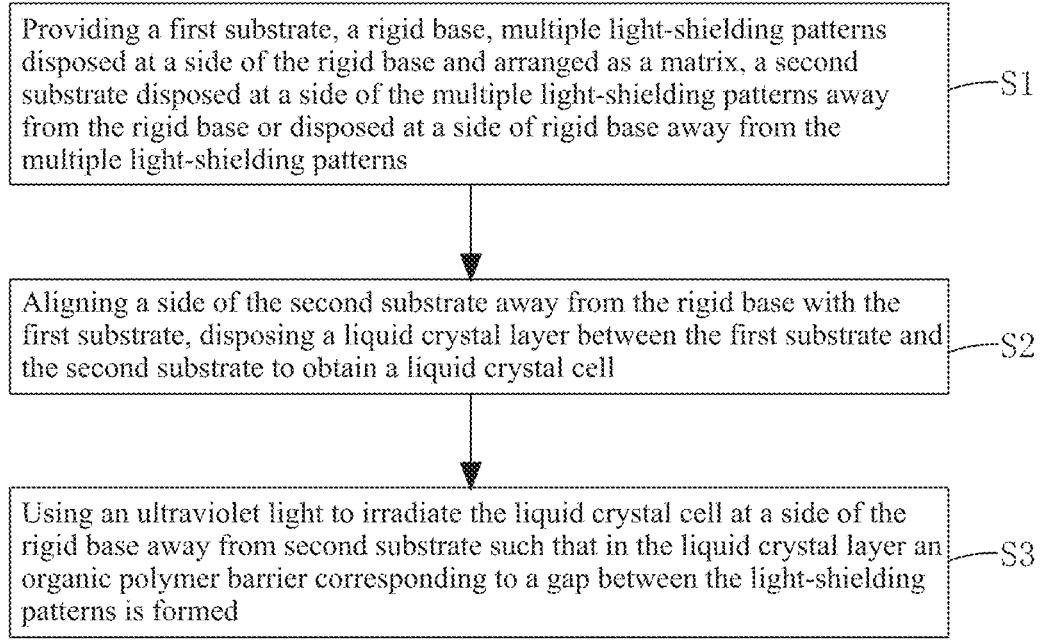
FIG. 1 is a flow chart of a manufacturing method for a flexible liquid crystal display panel of the present invention.

With reference to FIG. 1, the present invention provides with a manufacturing method for a flexible liquid crystal display panel, including following steps:

Step S1: providing a first substrate, a rigid base 200, multiple light-shielding patterns 300 disposed at a side of the rigid base 20 and arranged as a matrix, a second substrate disposed at a side of the multiple light-shielding patterns 300 away from the rigid base 200 or disposed at a side of rigid base 20 away from the multiple light-shielding patterns 300.

Figure 2:
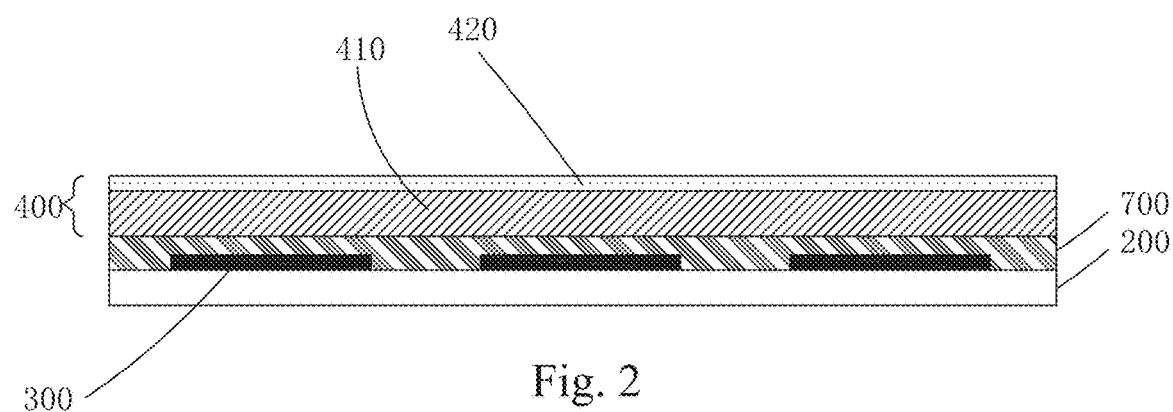
FIG. 2 and FIG. 3 is a schematic diagram of step S1 of a manufacturing method for a flexible liquid crystal display panel according to a first embodiment of the present invention.
Figure 3:
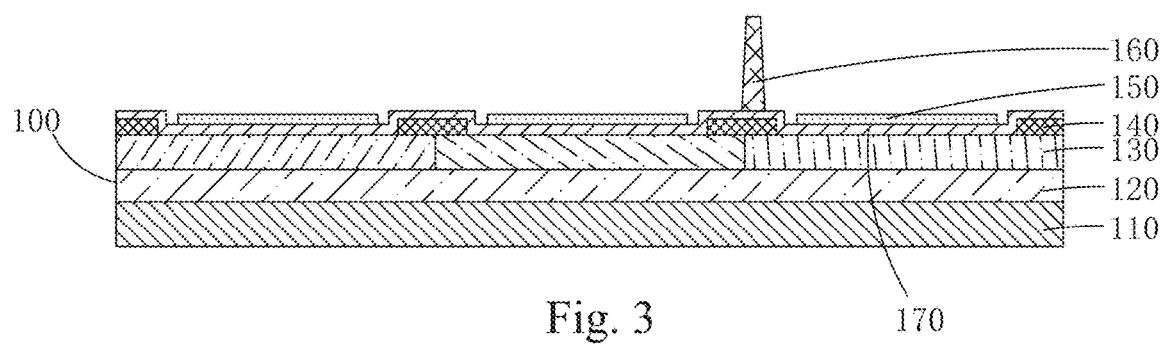

Specifically, with reference to FIG. 2 and FIG. 3, in a first embodiment of the present invention, the first substrate is a TFT array substrate 100, and the second substrate is a CF substrate 400.

Specifically, with reference to FIG. 3, in the first embodiment of the present invention, the TFT array substrate 100 is a TFT array substrate designed with POA (spacers disposed on the array substrate) including a first flexible base 110, a TFT array layer 120 and a color resist layer 130 sequentially disposed at a side of the flexible base 110, a black matrix 140 and a pixel electrode 150 disposed at a side of the color resist layer 130 away from the first flexible base 110, a spacer 160 disposed at a side of the black matrix 140 away from the first flexible base 110. Correspondingly, with reference to FIG. 2, in the first embodiment of the present invention, the CF substrate 400 includes a second flexible base 410, and a common electrode layer 420 disposed at a side of the second flexible base 410 away from the rigid base 200. Of course, the TFT array substrate 100 can also adopt a TFT array substrate 100 designed with COA (color filter on array substrate). The only requirement is to dispose a spacer on a common electrode 420 at a side of the CF substrate 400. The TFT array substrate 100 can also adopt a TFT array substrate without disposing a color resist layer and spacer as the conventional art. The only requirement is to dispose the color resist layer between the second flexible substrate 410 and the common electrode layer 420 at the CF substrate 400, and the spacer is disposed on the common electrode 420 at a side of the CF substrate 400. The above arrangement will not affect the performance of the present invention.

Specifically, in the first embodiment of the present invention, a passivation layer 170 covering the black matrix 140 is also provided on the color resist layer 130. The pixel electrode 150 and the spacer 160 are all manufactured on the passivation layer 170.

Specifically, with reference to FIG. 2, in the first embodiment of the present invention, the CF substrate 400 is disposed at a side of the light-shielding pattern 300 away from the rigid base 200. Specifically, the second flexible base 410 of the CF substrate 400 is disposed at a side of the light-shielding pattern 300 away from the rigid base 200

Preferably, with reference to FIG. 2, a planarization layer 700 is disposed between the CF substrate 400 and the light-shielding pattern 300.

Specifically, in the first embodiment of the present invention, the process of forming the light-shielding pattern 300 at a side of the rigid base 200, and forming a CF substrate 400 at a side of the light-shielding pattern 300 away from the rigid base 200 is: forming a light-shielding material layer at a side of the rigid base 200, exposing and developing the light-shielding material layer in order to obtain multiple light-shielding patterns 300 arranged as a matrix. Forming the planarization layer 700 that covers the multiple light-shielding patterns 300 on the rigid base 200. Sequentially forming the second flexible base 410 and a common electrode layer 420 at a side of the planarization layer 700 away from the light-shielding patterns 300 in order to obtain the CF substrate 400.

Specifically, the material of the rigid base 200 is a transparent material such as a glass.

Specifically, the material of the light-shielding pattern 300 is any light-shielding material such as a material for manufacturing a black matrix in the conventional art.

Figure 16:
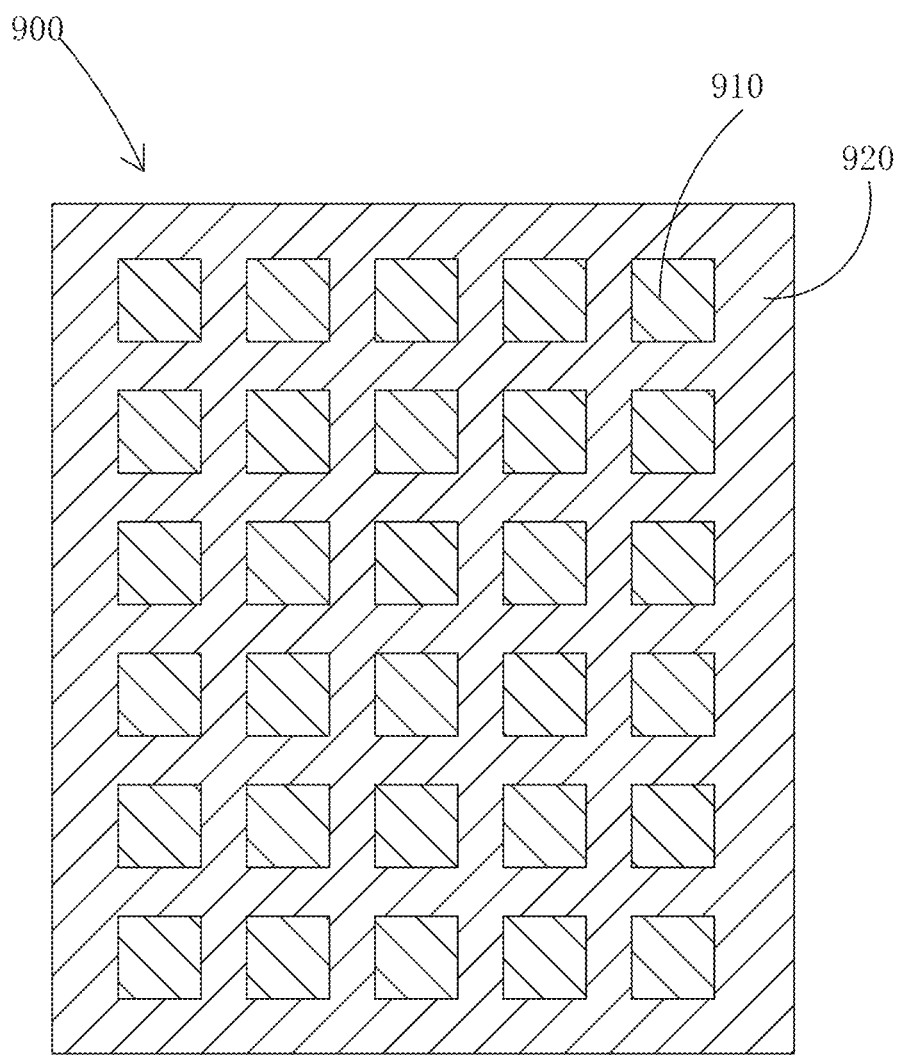
FIG. 16 is a schematic diagram of a mask plate of a manufacturing method for a flexible liquid crystal display panel of the present invention.

Furthermore, with reference to FIG. 16, in the present invention, using a mask plate 900 to expose and develop the light-shielding material layer. The mask plate 900 includes multiple first regions 910 and a second region 920 disposed outside the multiple first regions 910. When using a positive photoresist material for the material of the light-shielding material layer, the first regions 910 is a light-shielding region, and the second region 920 is a light-transparent region. When using a negative photoresist material as the material of the light-shielding material layer, the first region 910 is a light-transparent region, and the second region 920 is a light-shielding region so as to use the mask plate 900 to expose and develop the light-shielding material layer to obtain the multiple light-shielding patterns 300 arranged as a matrix.

Step S2: aligning a side of the second substrate away from the rigid base 200 with the first substrate, disposing a liquid crystal layer 500 between the first substrate and the second substrate in order to obtain a liquid crystal cell 10.

The liquid crystal layer 500 includes liquid crystal molecules 510 and polymerizable monomer 520 doped in the liquid crystal molecules 510; the liquid crystal cell 10 includes multiple pixel regions 11 arranged as a matrix, the multiple light-shielding patterns 300 respectively block the multiple pixel regions 11.

Preferably, through designing the size of the light-shielding pattern 300 and the size of the pixel region 11 in advance such that each light-shielding pattern 300 has a same size as the pixel region 11 blocked by the light-shielding pattern.

Figure 4:
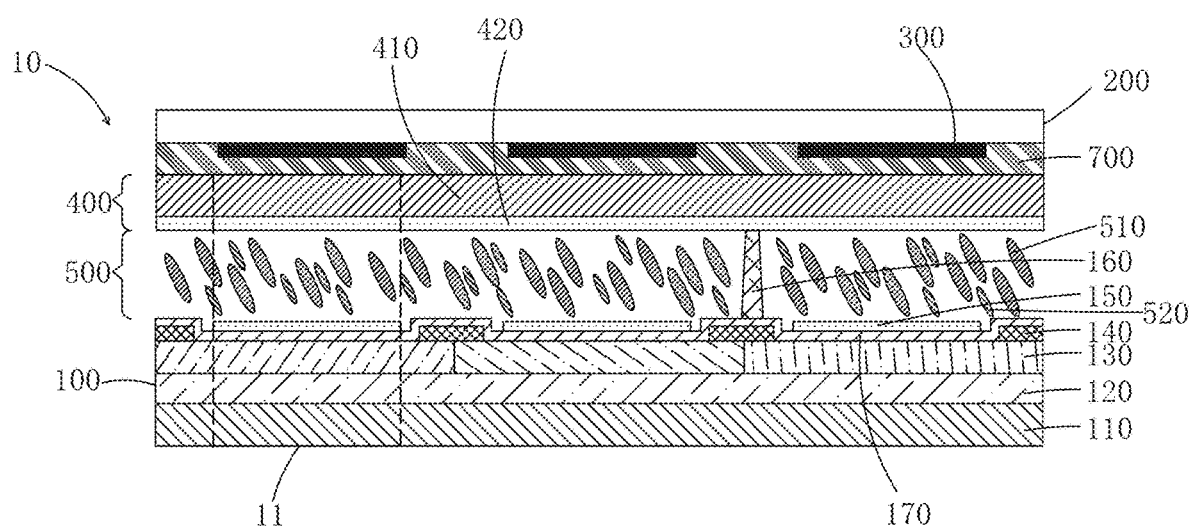
FIG. 4 is a schematic diagram of step S2 of a manufacturing method for a flexible liquid crystal display panel according to a first embodiment of the present invention.

With reference to FIG. 4, in the first embodiment of the present invention, in the step S2, when aligning a side of the CF substrate 400 away from the rigid base 200, that is a side where the common electrode 420 is located, with the TFT array substrate 100, a side of the TFT array substrate 100 provided with a spacer 160 is opposite to a side of the CF substrate 400 provided with the common electrode 420.

Step S3: using an ultraviolet (UV) light to irradiate the liquid crystal cell 10 at a side of the rigid base 200 away from second substrate such that the polymerizable monomer 520 in the liquid crystal layer 500 is reacted so as to form an organic polymer barrier 600 corresponding to a gap between the light-shielding patterns 300, that is an interface of adjacent pixel regions 11 in the liquid crystal layer 500.

Figure 5:
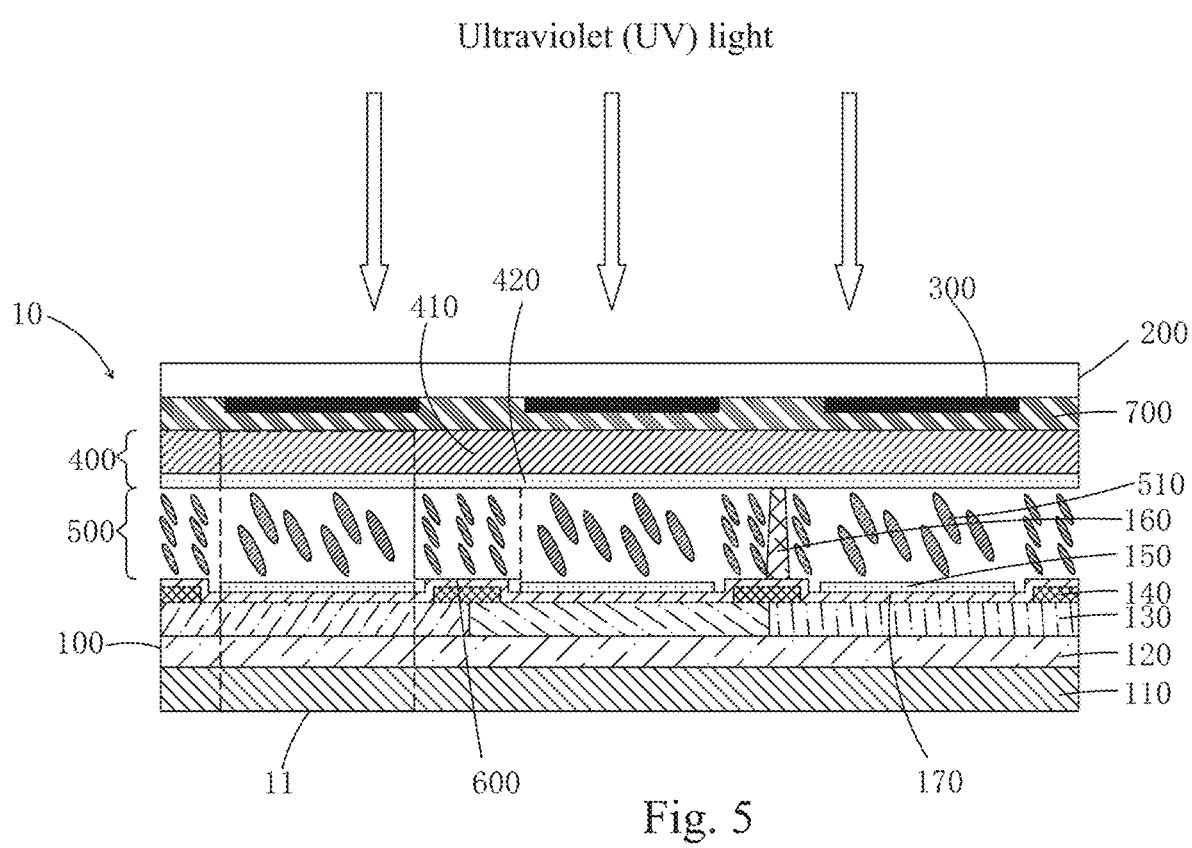
FIG. 5 is a schematic diagram of step S3 of a manufacturing method for a flexible liquid crystal display panel according to a first embodiment of the present invention.
Figure 6:
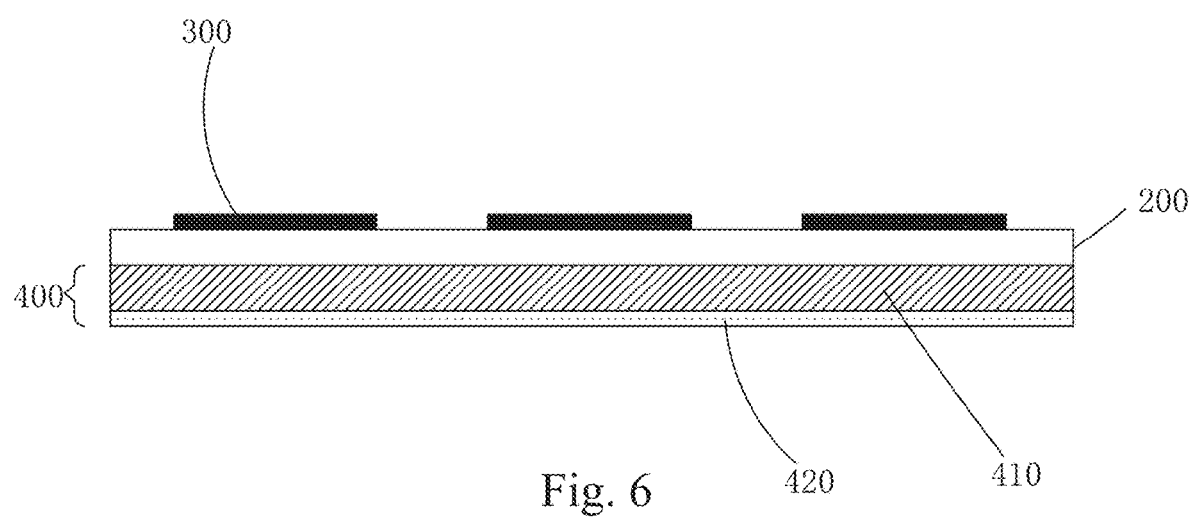
FIG. 6 is a schematic diagram of step S1 of a manufacturing method for a flexible liquid crystal display panel according to a second embodiment of the present invention.
Figure 7:
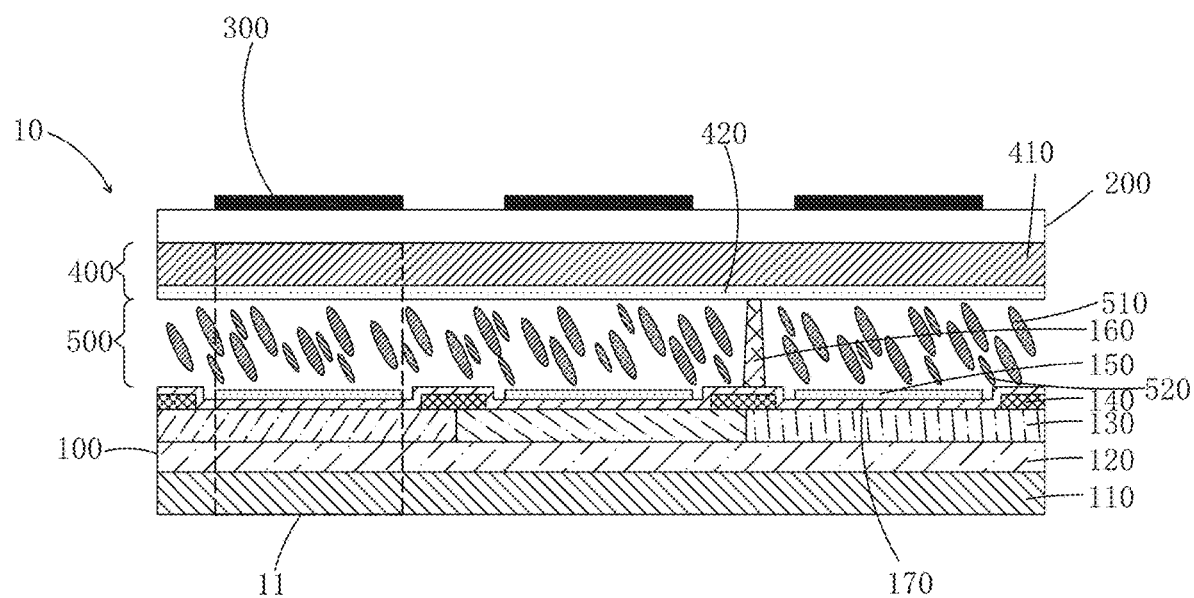
FIG. 7 is a schematic diagram of step S2 of a manufacturing method for a flexible liquid crystal display panel according to a second embodiment of the present invention.
Figure 8:
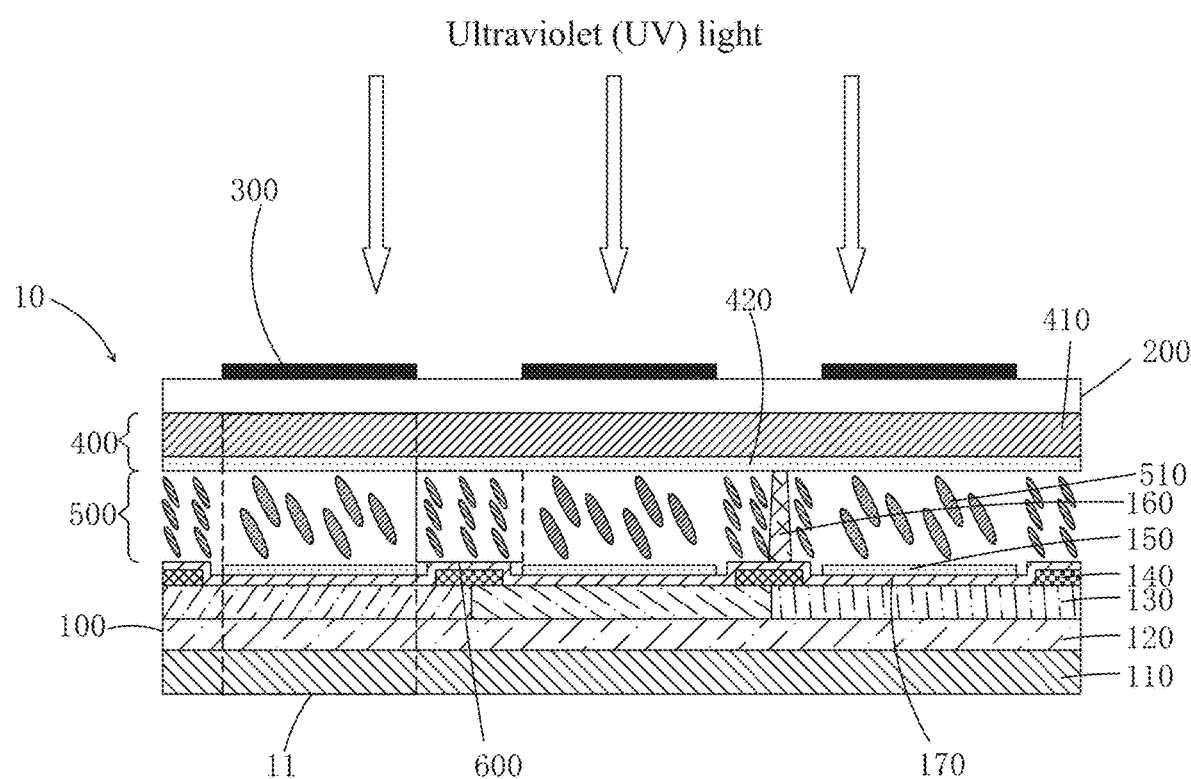
FIG. 8 is a schematic diagram of step S3 of a manufacturing method for a flexible liquid crystal display panel according to a second embodiment of the present invention.
Figure 9:
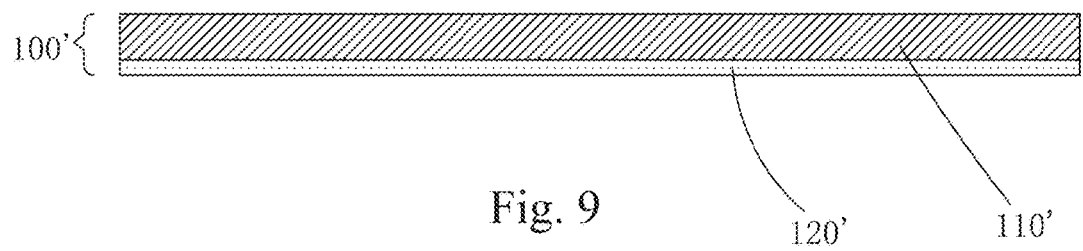
FIG. 9 and FIG. 10 is a schematic diagram of step S of a manufacturing method for a flexible liquid crystal display panel according to a third embodiment of the present invention.

Specifically, with reference to FIG. 5, in the first embodiment of the present invention, in the step S3, using the UV light to irradiate the liquid crystal cell 10 at a side of the rigid base 200 away from the CF substrate 400 such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500.

Specifically, the manufacturing method of the flexible liquid crystal display panel further includes a step S4: removing the rigid base 200 and the light-shielding pattern from the second substrate. In the first embodiment of the present invention, in the step S4, removing the rigid base 200 and the light-shielding pattern 300 from the CF substrate 400.

It should be noted that in the first embodiment of the present invention, manufacturing the light-shielding pattern 300 at a side of the rigid base 200 and manufacturing a CF substrate 400 at a side of the base rigid base 200 away from the light-shielding pattern 300. The light-shielding pattern 300 covers the pixel region 11 for functioning as a blocking when using the UV light to irradiate the liquid crystal cell in order to form the organic polymer barrier 600 such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500. Using the organic polymer barrier 600 to support the thickness of the liquid crystal cell and stabilize the state of the liquid crystals.

Comparing to the conventional art, the present invention can omit the use of a fine mask plate, reduce the production cost, avoid a slit diffraction caused by the fine mask so that the manufacturing process is simple and the fineness of the organic polymer barrier 600 is higher to effectively reduce the cost of the product. Meanwhile, because each light-shielding pattern 300 covers one pixel region 11 in the exposure process of the UV light, no UV light will enter the pixel region 11 so that the liquid crystal molecules 510 inside the pixel region 11 will not generate a misalignment in order to ensure the quality of the product. Besides, after the rigid substrate 200 and the light-shielding pattern 300 are removed from the CF substrate 400, the rigid substrate 200 and the light-shielding pattern 300 can reused to reduce the cost further.

With reference to FIG. 1, FIG. 3, FIG. 6 FIG. 7 and FIG. 8, which shows a second embodiment of the present invention. The difference between the second embodiment and the first embodiment is that the CF substrate 400 is disposed at a side of the rigid base 200 away from the light-shielding pattern 300. Specifically, the second flexible base 410 is disposed at a side of the CF substrate 400 away from the light-shielding pattern 300.

Specifically, in the second embodiment of the present invention, the process of forming the light-shielding pattern at a side of the rigid base 200 and forming the CF substrate 400 at a side of the rigid base 200 away from the light-shielding pattern 300 can be: forming a light-shielding material layer at a side of the rigid base 200, exposing and developing the light-shielding material layer to obtain multiple light-shielding patterns 300 arranged as a matrix. Sequentially forming the second flexible base 410 and the common electrode 420 at a side of the rigid base 200 away from the light-shielding pattern 300 in order to obtain the CF substrate 400. That is, manufacturing the light-shielding pattern first, then, manufacturing the CF substrate 400.

Or, the process of forming the light-shielding pattern at a side of the rigid base 200 and forming the CF substrate 400 at a side of the rigid base 200 away from the light-shielding pattern 300 can also be: sequentially forming the second base 410 and the common electrode 420 at a side of the rigid base 200 in order to obtain the CF substrate 400, forming a light-shielding material layer at a side of the rigid base 200 away from the CF substrate 420, exposing and developing the light-shielding material layer to obtain multiple light-shielding patterns arranged as a matrix. That is, manufacturing the CF substrate 400 first, then, manufacturing light-shielding pattern.

The other portion is the same as the first embodiment, no more repeating.

It should be noted that in the second embodiment of the present invention, forming the light-shielding pattern at a side of the rigid base 200 and forming the CF substrate 400 at a side of the rigid base 200 away from the light-shielding pattern 300, the light-shielding pattern 300 covers the pixel region 11 for functioning as a blocking when using the UV light to irradiate the liquid crystal cell in order to form the organic polymer barrier 600 such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500. Using the organic polymer barrier 600 to support the thickness of the liquid crystal cell and stabilize the state of the liquid crystals. Comparing to the conventional art, the present invention can omit the use of a fine mask plate, reduce the production cost, avoid a slit diffraction caused by the fine mask so that the manufacturing process is simple and the fineness of the organic polymer barrier 600 is higher to effectively reduce the cost of the product. Meanwhile, because each light-shielding pattern 300 covers one pixel region 11 in the exposure process of the UV light, no UV light will enter the pixel region 11 so that the liquid crystal molecules 510 inside the pixel region 11 will not generate a misalignment in order to ensure the quality of the product. Besides, after the rigid substrate 200 and the light-shielding pattern 300 are removed from the CF substrate 400, the rigid substrate 200 and the light-shielding pattern 300 can reused to reduce the cost further.

With reference to FIG. 1, FIG. 9 to FIG. 12, which is a third embodiment of the manufacturing method for liquid crystal display panel of the present invention. The difference between the third embodiment and the first embodiment is that the first substrate is a CF substrate 100' and the second substrate is a TFT array substrate 400'.

Figure 10:
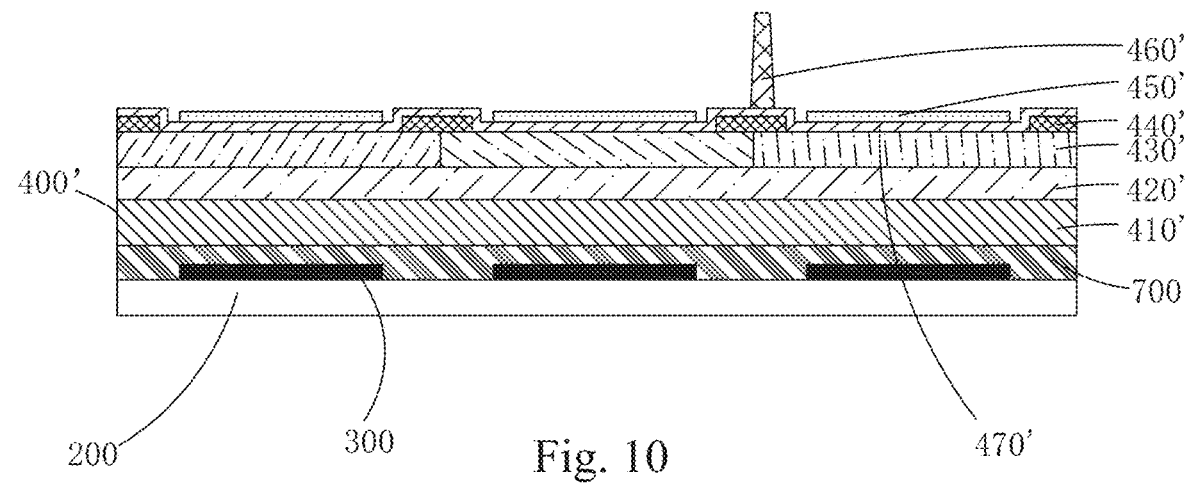
Figure 11:
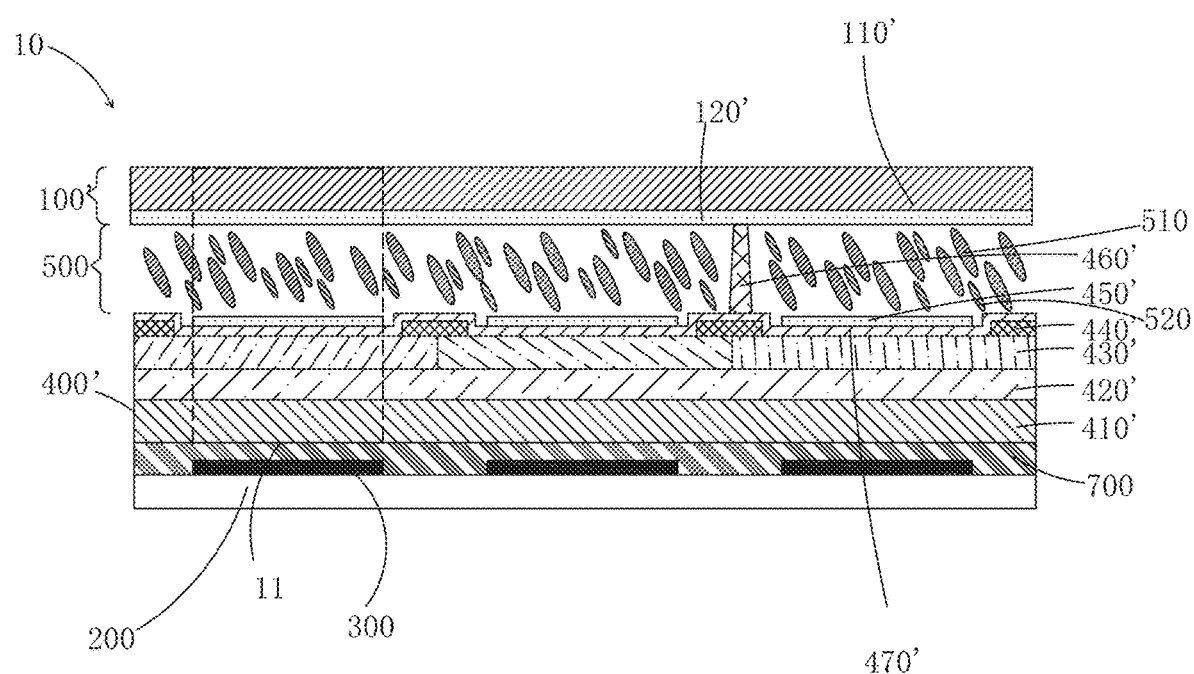
FIG. 11 is a schematic diagram of step S2 of a manufacturing method for a flexible liquid crystal display panel according to a third embodiment of the present invention.
Figure 12:
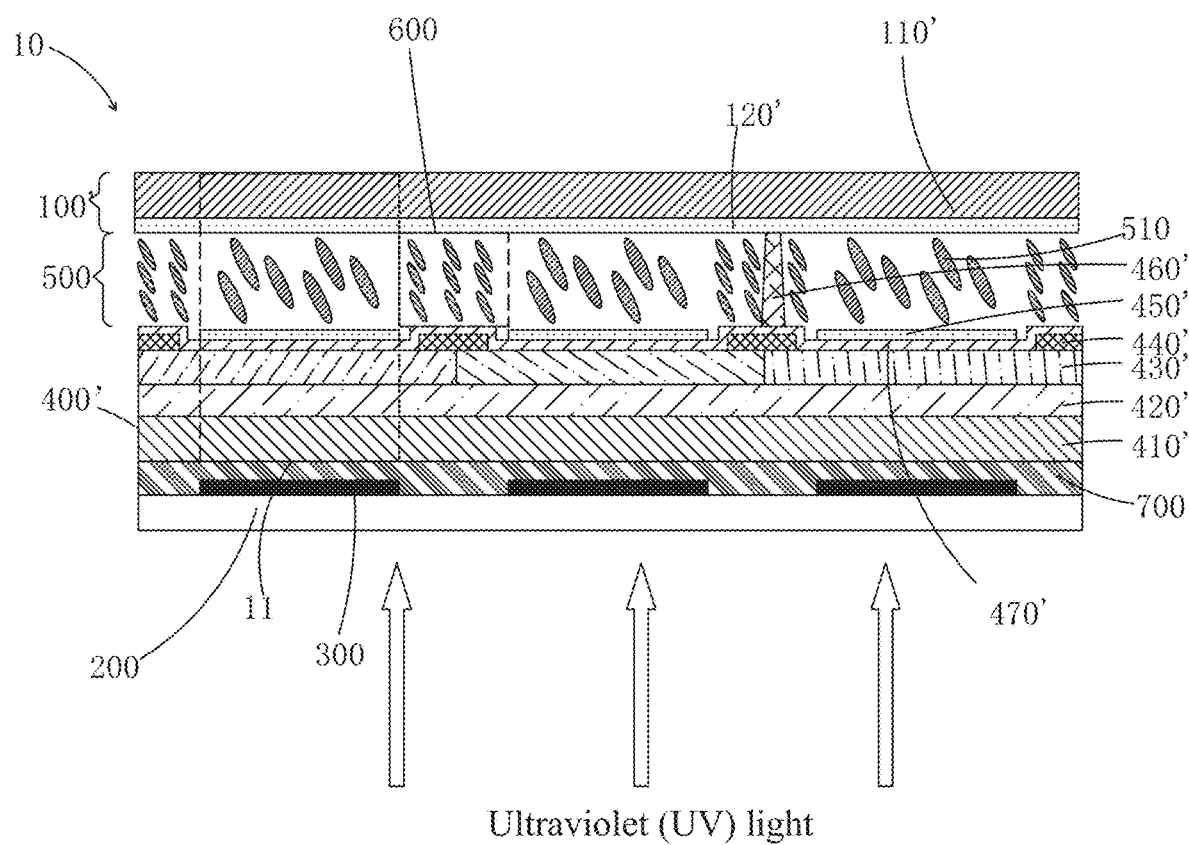
FIG. 12 is a schematic diagram of step S3 of a manufacturing method for a flexible liquid crystal display panel according to a third embodiment of the present invention.
Figure 13:
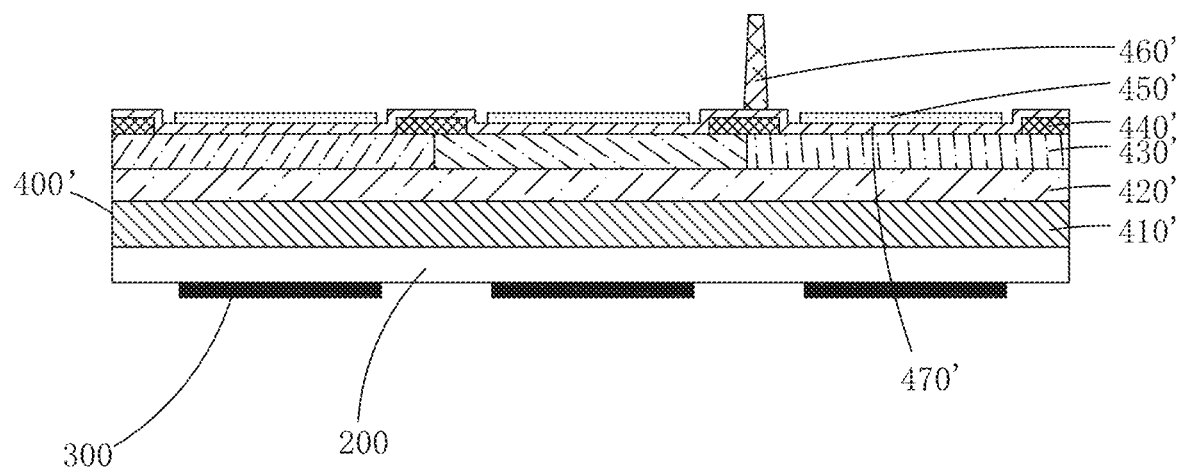
FIG. 13 is a schematic diagram of step S1 of a manufacturing method for a flexible liquid crystal display panel according to a fourth embodiment of the present invention.
Figure 14:
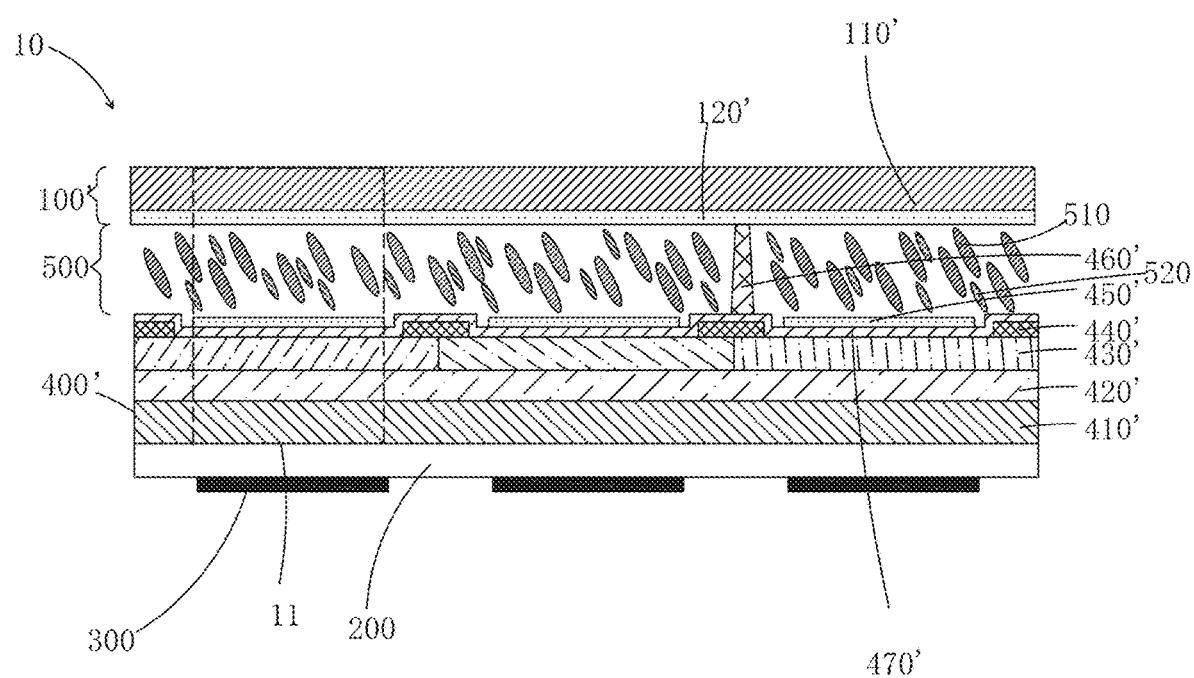
FIG. 14 is a schematic diagram of step S2 of a manufacturing method for a flexible liquid crystal display panel according to a fourth embodiment of the present invention.
Figure 15:
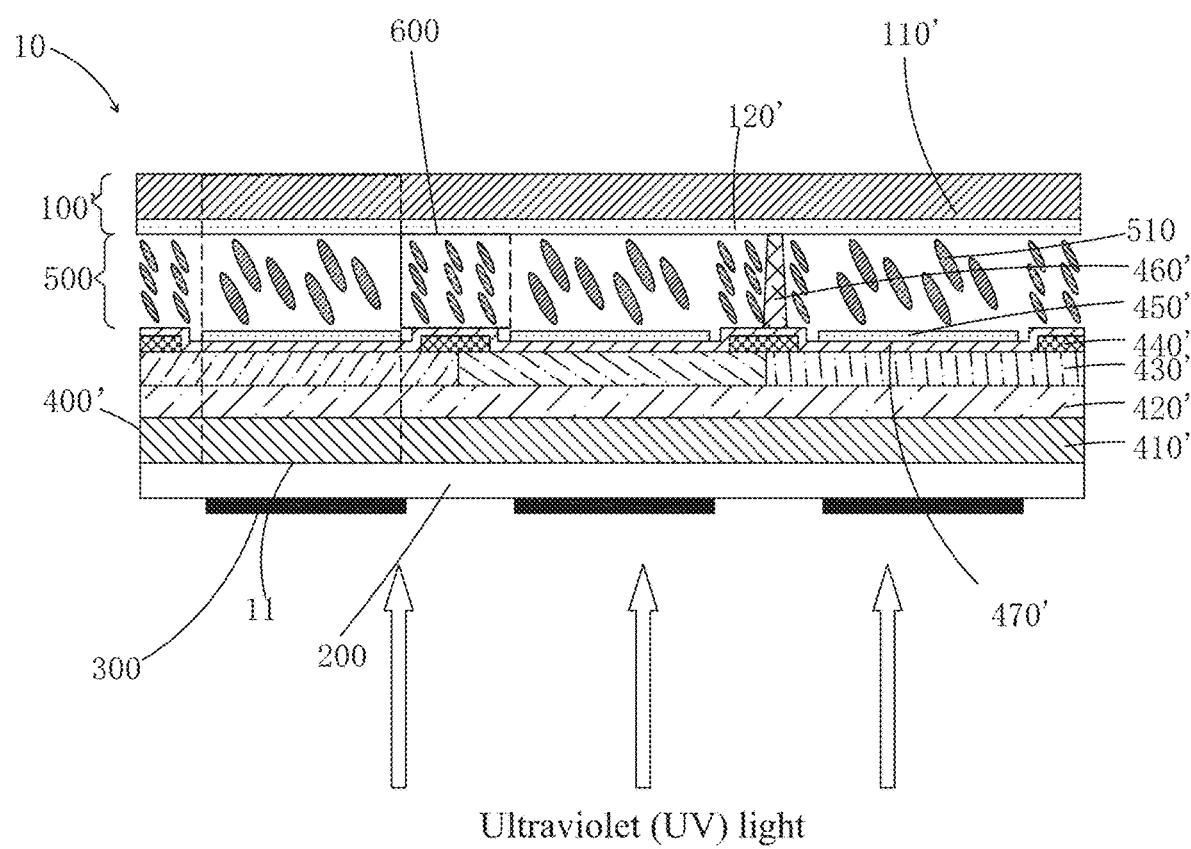
FIG. 15 is a schematic diagram of step S3 of a manufacturing method for a flexible liquid crystal display panel according to a fourth embodiment of the present invention.

Specifically, with reference to FIG. 10, in the third embodiment of the present invention, the TFT array substrate 400' is a TFT array substrate designed with POA, and including a second flexible base 410', a TFT array layer 420' and a color resist layer 430' sequentially disposed at a side of the second flexible base 410' away from the rigid substrate 200, a black matrix 440' and a pixel electrode 450' disposed at a side of the color resist layer 430' away from the second flexible base 410' and a spacer 460' disposed at a side of the black matrix 440' away from the second flexible base 410'. Correspondingly, with reference to FIG. 9, the CF substrate 100' includes a first flexible base 110' and a common electrode 120' disposed at a side of the first flexible base 110'.

Of course, the TFT array substrate 400' can also adopts a TFT array substrate with a COA (color filter on array substrate), only requiring to dispose the spacer on the common electrode 120' at a side of the CF substrate 100'. The TFT array substrate 400' can also adopt a TFT array substrate without disposing the color resist layer and spacer as the conventional art, only requiring to dispose the color resist layer between the first flexible base 110' of the CF substrate 100' and common electrode 120'.

Specifically, the third embodiment of the present invention also provides with a passivation layer 470' covering the black matrix 440' on the color resist layer 430', and the pixel electrode 450' and the spacer 460' are all manufactured on the passivation layer 470'.

Specifically, with reference to FIG. 10, in the third embodiment of the present invention, the TFT array substrate 400' is disposed at a side of the light-shielding pattern 300 away from the rigid base 200.

Preferably, with reference to FIG. 10, a planarization layer 700 is disposed between the TFT array substrate 400' and the light-shielding pattern 300;

Specifically, in the third embodiment of the present invention, the process of forming the light-shielding pattern 300 at a side of the rigid base 200, and forming a TFT array substrate 400' at a side of the light-shielding pattern 300 away from the rigid base 200 is: forming a light-shielding material layer at a side of the rigid base 200, exposing and developing the light-shielding material layer in order to obtain multiple light-shielding patterns 300 arranged as a matrix, forming the planarization layer 700 that covers the multiple light-shielding patterns 300 on the rigid base 200, sequentially forming the second flexible base 410', a TFT array layer 420' and a color resist layer 430' at a side of the planarization layer 700 away from the light-shielding patterns 300, forming a black matrix 440' and a pixel electrode 450' at a side of the color resist layer 430; away from the second flexible base 410', manufacturing the spacer 460' at a side of the black matrix 440' away from the second flexible base 410' in order to obtain the TFT array substrate 400'.

Because in the third embodiment of the present invention, the first substrate is a CF substrate 100', and the second substrate is a TFT array substrate 400'. Correspondingly, in the step S2, aligning a side of the TFT array substrate 400' away from the rigid base 200 with the CF substrate 100' in order to obtain 10.

Specifically, in the third embodiment of the present invention, in the step S2, when aligning a side of the TFT array substrate 400' away from the rigid base 200 with the CF substrate 100', a side of the CF substrate 100' provided with the common electrode 120' is opposite to a side of the TFT array substrate 400' provided with the spacer 460'.

Because in the third embodiment of the present invention, the first substrate is a CF substrate 100', and the second substrate is a TFT array substrate 400', correspondingly, in the step S3, using the UV light to irradiate the liquid crystal cell 10 at a side of the rigid base 200 away from the TFT array substrate 400' such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500.

Because in the third embodiment of the present invention, the first substrate is a CF substrate 100', and the second substrate is a TFT array substrate 400', correspondingly, in the step S4, removing the rigid base 200 and the light-shielding pattern 300 from the TFT array substrate 400'.

It should be noted that in the third embodiment of the present invention, forming the light-shielding pattern at a side of the rigid base 200 and forming the TFT array substrate 400' at a side of the rigid base 200 away from the light-shielding pattern 300, the light-shielding pattern 300 covers the pixel region 11 for functioning as a blocking when using the UV light to irradiate the liquid crystal cell in order to form the organic polymer barrier 600 such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500. Using the organic polymer barrier 600 to support the thickness of the liquid crystal cell and stabilize the state of the liquid crystals. Comparing to the conventional art, the present invention can omit the use of a fine mask plate, reduce the production cost, avoid a slit diffraction caused by the fine mask so that the manufacturing process is simple and the fineness of the organic polymer barrier 600 is higher to effectively reduce the cost of the product. Meanwhile, because each light-shielding pattern 300 covers one pixel region 11 in the exposure process of the UV light, no UV light will enter the pixel region 11 so that the liquid crystal molecules 510 inside the pixel region 11 will not generate a misalignment in order to ensure the quality of the product. Besides, after the rigid substrate 200 and the light-shielding pattern 300 are removed from the TFT array substrate 400', the rigid substrate 200 and the light-shielding pattern 300 can reused to reduce the cost further.

With reference to FIG. 1, FIG. 9, FIG. 13, FIG. 14 and FIG. 15, which is a fourth embodiment of the manufacturing method for a flexible liquid crystal display panel of the present invention. The difference between the fourth embodiment and the third embodiment is that the TFT array substrate 400' is disposed at a side of the rigid base 200 away from the light-shielding pattern 300. Specifically, the second flexible base 410' of the TFT array substrate 400' is disposed at a side of the rigid base 200 away from the light-shielding pattern 300.

Specifically, in the fourth embodiment of the present invention, the process of forming the light-shielding pattern 300 at a side of the rigid base 200, and forming a TFT array substrate 400' at a side of the light-shielding pattern 300 away from the rigid base 200 is: forming a light-shielding material layer at a side of the rigid base 200, exposing and developing the light-shielding material layer to obtain multiple light-shielding patterns 300 arranged as a matrix, sequentially forming the second flexible base, the TFT array layer 420' and the color resist layer 430' at a side of the rigid base away from the light-shielding patterns 300, forming the black matrix 440' and the pixel electrode 450' at a side of the color resist layer 430 away from the second flexible base 410, manufacturing a spacer 460' at a side of the black matrix 440' away from the second flexible base 410' in order to obtain the TFT array substrate 400'. That is manufacturing the light-shielding pattern 300 first and then, manufacturing the TFT array substrate 400'.

Or, the process of forming the light-shielding pattern 300 at a side of the rigid base 200, and forming a TFT array substrate 400' at a side of the light-shielding pattern 300 away from the rigid base 200 is: sequentially forming a second flexible base 410', a TFT array layer 420' and a color resist layer 430' at a side of the rigid base 200, manufacturing the black matrix layer 440' and the pixel electrode 450' at a side of the color resist layer 430' away from the second flexible base 410', manufacturing a spacer 460' at a side of the black matrix 440' away from the second flexible base 410' in order to obtain the TFT array substrate 400', forming a light-shielding material layer at a side of the rigid base 200 away from the TFT array substrate 400', exposing and developing the light-shielding material layer to obtain multiple light-shielding patterns 300 arranged as a matrix. That is, manufacturing the TFT array substrate 400' first, then, manufacturing the light-shielding patterns 300.

The other portion is the same as the third embodiment, no more repeating.

It should be noted that in the fourth embodiment of the present invention, forming the light-shielding pattern 300 at a side of the rigid base 200 and forming the TFT array substrate 400' at a side of the rigid base 200 away from the light-shielding pattern 300, the light-shielding pattern 300 covers the pixel region 11 for functioning as a blocking when using the UV light to irradiate the liquid crystal cell in order to form the organic polymer barrier 600 such that the polymerizable monomer 520 in the liquid crystal layer 500 is reacted so as to form an organic polymer barrier 600 at a gap between the light-shielding pattern 300, that is an interface of adjacent pixel regions 11 in the liquid crystal layer 500. Using the organic polymer barrier 600 to support the thickness of the liquid crystal cell and stabilize the state of the liquid crystals. Comparing to the conventional art, the present invention can omit the use of a fine mask plate, reduce the production cost, avoid a slit diffraction caused by the fine mask so that the manufacturing process is simple and the fineness of the organic polymer barrier 600 is higher to effectively reduce the cost of the product. Meanwhile, because each light-shielding pattern 300 covers one pixel region 11 in the exposure process of the UV light, no UV light will enter the pixel region 11 so that the liquid crystal molecules 510 inside the pixel region 11 will not generate a misalignment in order to ensure the quality of the product. Besides, after the rigid substrate 200 and the light-shielding pattern 300 are removed from the TFT array substrate 400', the rigid substrate 200 and the light-shielding pattern 300 can reused to reduce the cost further.

In summary, in the manufacturing method for a flexible liquid crystal display panel, manufacturing multiple light-shielding patterns disposed at a side of the rigid base and arranged as a matrix, a second substrate disposed at a side of the multiple light-shielding patterns away from the rigid base 200 or disposed at a side of rigid base away from the multiple light-shielding patterns; aligning a side of the second substrate away from the rigid base 200 with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions; using an ultraviolet (UV) light to irradiate the liquid crystal cell at a side of the rigid base away from second substrate in order to form an organic polymer barrier corresponding to a gap between the light-shielding patterns. The present invention is simple in the process, and can effectively increase the fineness of the organic polymer barrier 600, and reduce the production cost.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A manufacturing method for a flexible liquid crystal display panel, comprising steps of:

providing a first substrate, a rigid base, multiple light-shielding patterns disposed at a side of the rigid base and arranged as a matrix, a second substrate disposed at a side of the multiple light-shielding patterns away from the rigid base or disposed at a side of rigid base away from the multiple light-shielding patterns;

aligning a side of the second substrate away from the rigid base 200 with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions;

using an ultraviolet (UV) light to irradiate the liquid crystal cell at a side of the rigid base away from second substrate in order to form an organic polymer barrier corresponding to a gap between the light-shielding patterns;

wherein the first substrate is a TFT array substrate and a second substrate is a CF substrate;

wherein the TFT array substrate includes a first flexible base, a TFT array layer and a color resist layer sequentially disposed at a side of the flexible base, a black matrix and a pixel electrode disposed at a side of the color resist layer away from the first flexible base, a spacer disposed at a side of the black matrix away from the first flexible base;

the CF substrate includes a second flexible base, and a common electrode layer disposed at a side of the second flexible base away from the rigid base;

when aligning a side of the CF substrate away from the rigid base with the TFT array substrate, a side of the TFT array substrate provided with a spacer is opposite to a side of the CF substrate provided with the common electrode.

2. The manufacturing method for a flexible liquid crystal display panel according to claim 1, wherein each light-shielding pattern has a same size as the pixel region blocked by the light-shielding pattern.

3. The manufacturing method for a flexible liquid crystal display panel according to claim 1, wherein the method further includes a step of removing the rigid base and the light shielding pattern from the second substrate.

4. The manufacturing method for a flexible liquid crystal display panel according to claim 1, wherein the CF substrate is disposed at a side of the light-shielding pattern away from the rigid base;
   a planarization layer is disposed between the CF substrate and the light-shielding pattern;
   the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer in order to obtain multiple light-shielding patterns arranged as a matrix, forming the planarization layer that covers the multiple light-shielding patterns on the rigid base, sequentially forming the second flexible base and a common electrode layer at a side of the planarization layer away from the light-shielding patterns in order to obtain the CF substrate.

5. The manufacturing method for a flexible liquid crystal display panel according to claim 1, wherein the CF substrate is disposed at a side of the light-shielding pattern away from the rigid base;
   the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer to obtain multiple light-shielding patterns arranged as a matrix, sequentially forming the second flexible base and the common electrode at a side of the rigid base away from the light-shielding pattern in order to obtain the CF substrate, or
   sequentially forming the second base and the common electrode at a side of the rigid base in order to obtain the CF substrate, forming a light-shielding material layer at a side of the rigid base away from the CF substrate, exposing and developing the light-shielding material layer to obtain multiple light-shielding patterns arranged as a matrix.

6. The manufacturing method for a flexible liquid crystal display panel according to claim 1, wherein the first substrate is a CF substrate and the second substrate is a TFT array substrate;
   the CF substrate includes a first flexible base and a common electrode disposed at a side of the first flexible base;
   the TFT array substrate a second flexible base, a TFT array layer and a color resist layer sequentially disposed at a side of the second flexible base away from the rigid substrate, a black matrix and a pixel electrode disposed at a side of the color resist layer away from the second flexible base and a spacer disposed at a side of the black matrix away from the second flexible base;
   when aligning a side of the TFT array substrate away from the rigid base with the CF substrate, a side of the CF substrate provided with the common electrode is opposite to a side of the TFT array substrate provided with the spacer.

7. The manufacturing method for a flexible liquid crystal display panel according to claim 6, wherein
   the process of forming the light-shielding pattern at a side of the rigid base, and forming a TFT array substrate at a side of the light-shielding pattern away from the rigid base is: forming a light-shielding material layer at a side of the rigid base, exposing and developing the light-shielding material layer in order to obtain multiple light-shielding patterns arranged as a matrix, forming the planarization layer that covers the multiple light-shielding patterns on the rigid base, sequentially forming the second flexible base, a TFT array layer and a color resist layer at a side of the planarization layer away from the light-shielding patterns, forming a black matrix and a pixel electrode at a side of the color resist layer; away from the second flexible base, manufacturing the spacer at a side of the black matrix away from the second flexible base.

8. The manufacturing method for a flexible liquid crystal display panel according to claim 6, wherein the TFT array substrate is disposed at a side of the rigid base away from the light-shielding pattern;
   the process of forming the light-shielding pattern at a side of the rigid base, and forming a TFT array substrate at a side of the light-shielding pattern away from the rigid base is:
   forming a light-shielding material layer at a side of the rigid base, exposing and developing the light-shielding material layer to obtain multiple light-shielding patterns arranged as a matrix, sequentially forming the second flexible base, the TFT array layer and the color resist layer at a side of the rigid base away from the light-shielding patterns, forming the black matrix and the pixel electrode at a side of the color resist layer away from the second flexible base, manufacturing a spacer at a side of the black matrix away from the second flexible base in order to obtain the TFT array substrate; or,
   sequentially forming a second flexible base, a TFT array layer and a color resist layer at a side of the rigid base, manufacturing the black matrix layer and the pixel electrode at a side of the color resist layer away from the second flexible base, manufacturing a spacer at a side of the black matrix away from the second flexible base in order to obtain the TFT array substrate, forming a light-shielding material layer at a side of the rigid base away from the TFT array substrate, exposing and developing the light-shielding material layer to obtain multiple light-shielding patterns arranged as a matrix.

9. A manufacturing method for a flexible liquid crystal display panel, comprising steps of:
   providing a first substrate, a rigid base, multiple light-shielding patterns disposed at a side of the rigid base and arranged as a matrix, a second substrate disposed at a side of the multiple light-shielding patterns away from the rigid base or disposed at a side of rigid base away from the multiple light-shielding patterns;
   aligning a side of the second substrate away from the rigid base with the first substrate, disposing a liquid crystal layer between the first substrate and the second substrate in order to obtain a liquid crystal cell, wherein the liquid crystal layer includes liquid crystal molecules and polymerizable monomer doped in the liquid crystal molecules, the liquid crystal cell includes multiple pixel regions arranged as a matrix, the multiple light-shielding patterns respectively block the multiple pixel regions;

using an ultraviolet (UV) light to irradiate the liquid crystal cell at a side of the rigid base away from second substrate in order to form an organic polymer barrier corresponding to a gap between the light-shielding patterns;

removing the rigid base and the light shielding pattern from the second substrate;

wherein each light-shielding pattern has a same size as the pixel region blocked by the light-shielding pattern;

wherein the first substrate is a TFT array substrate and a second substrate is a CF substrate;

wherein the TFT array substrate includes a first flexible base, a TFT array layer and a color resist layer sequentially disposed at a side of the flexible base, a black matrix and a pixel electrode disposed at a side of the color resist layer away from the first flexible base, a spacer disposed at a side of the black matrix away from the first flexible base;

the CF substrate includes a second flexible base, and a common electrode layer disposed at a side of the second flexible base away from the rigid base; and when aligning a side of the CF substrate away from the rigid base with the TFT array substrate, a side of the TFT array substrate provided with a spacer is opposite to a side of the CF substrate provided with the common electrode.

10. The manufacturing method for a flexible liquid crystal display panel according to claim 9, wherein the CF substrate is disposed at a side of the light-shielding pattern away from the rigid base;

a planarization layer is disposed between the CF substrate and the light-shielding pattern;

the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer in order to obtain multiple light-shielding patterns arranged as a matrix, forming the planarization layer that covers the multiple light-shielding patterns on the rigid base, sequentially forming the second flexible base and a common electrode layer at a side of the planarization layer away from the light-shielding patterns in order to obtain the CF substrate.

11. The manufacturing method for a flexible liquid crystal display panel according to claim 9, wherein the CF substrate is disposed at a side of the light-shielding pattern away from the rigid base;

the process of forming the light-shielding pattern at a side of the rigid base, and forming a CF substrate at a side of the light-shielding pattern away from the rigid base is: forming a light-shielding material layer at a side of the rigid base, exposing and developing the light-shielding material layer to obtain multiple light-shielding patterns arranged as a matrix, sequentially forming the second flexible base and the common electrode at a side of the rigid base away from the light-shielding pattern in order to obtain the CF substrate, or sequentially forming the second base and the common electrode at a side of the rigid base in order to obtain the CF substrate, forming a light-shielding material layer at a side of the rigid base away from the CF substrate, exposing and developing the light-shielding material layer to obtain multiple light-shielding patterns arranged as a matrix.

* * * * *